CHARLES REESE.
Improvement in Method for Forcing Plants.
No. 125,332. Patented April 2, 1872.
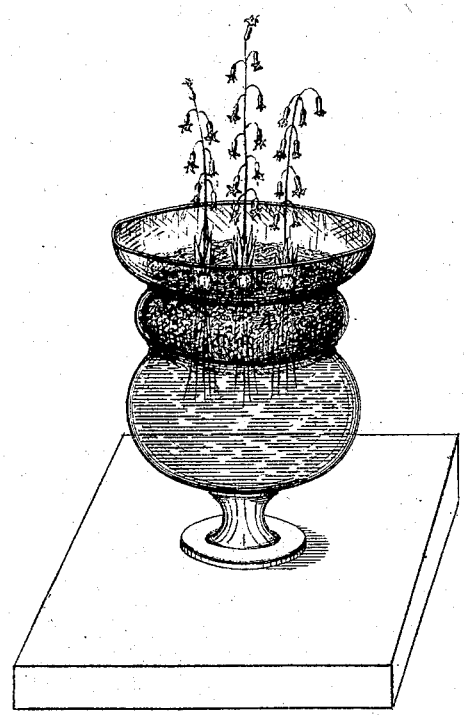

No. 125,332

UNITED STATES PATENT OFFICE.

CHARLES REESE, OF BALTIMORE, MARYLAND.

IMPROVEMENT IN METHODS FOR FORCING PLANTS.

Specification forming part of Letters Patent No. 125,332, dated April 2, 1872.

Specification describing a new and useful Method of Forcing Plants, invented by CHARLES REESE, of Baltimore, in the county of Baltimore and State of Maryland.

The invention relates to the forcing of plants, cuttings, or rootlets before their natural time of initial growth, and to bring out the bloom or flowers before early spring, as hereinafter fully described, and subsequently pointed out in the claim.

The drawing exhibits a view of a sponge, with the plant applied thereto, as an illustration of my new method.

Glasses filled with water have been used to accomplish this object, but are unreliable, since sometimes it succeeds, in a measure, and at other times fails altogether, notwithstanding the most careful attention.

I employ a sponge, as represented by the letter A in the drawing, or any other equivalent substance. The sponge is preferably placed in the top of a vase, which has been previously filled with water, and slitted to receive the plant. The capillary tubes of the sponge extract the water from the vase, and evaporate it gradually in the atmosphere proximate to the plant. The loose and porous character of the sponge allows the roots, as they protrude from the germ, to extend and ramify between the interstices. These rootlets also find some natural food in sponge, or the same may be there placed, or the water itself may be impregnated with nutritious matter. The bulb or rootlet, being thrust between the lips of the slitted sponge and covered thereby, has been found, by actual experiment, in a short time, to push up leaves and exhibit manifest signs of a vigorous and healthy life. In a comparison with those which were planted in glasses, the contrast is found to be most marked and decided in favor of the capillary substance. Of course other rootings and cuttings would be affected in an analogous manner. Hence this process will necessarily be of great value to all florists and nurserymen.

The result of these experiments has led me to believe that the cuttings of many kinds of plants that have been extremely difficult hitherto to root, by the old method, in sand, can be readily and surely rooted by the use of sponge; and that it is destined to become a valuable agent in the hands of the florist; and, as this use of the well-known material I believe to be originally applied to this purpose by myself, I claim the right to use it, not only for the purposes above mentioned, but wherever it may be used in the growth of plants, as a fertilizer, or be in any way instrumental in promoting their growth.

Having thus described my invention, what I claim as new, and desire to secure by Letters Patent, is—

The method of forcing bulbous roots, cuttings, or rootings in sponge or other equivalent substance, substantially in the manner described.

CHARLES REESE.

Witnesses:
    B. G. BLANCHARD,
    A. EDELEN.